United States Patent
Kim et al.

(10) Patent No.: US 8,594,258 B2
(45) Date of Patent: *Nov. 26, 2013

(54) ADAPTIVE NOISE FILTERING AND EQUALIZATION

(71) Applicant: Quellan, Inc., Atlanta, GA (US)

(72) Inventors: Andrew Joo Kim, Suwanee, GA (US); Vincent Mark Hietala, Albuquerque, NM (US); Sanjay Bajekal, Marietta, GA (US)

(73) Assignee: Quellan, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/673,147

(22) Filed: Nov. 9, 2012

(65) Prior Publication Data

US 2013/0064335 A1 Mar. 14, 2013

Related U.S. Application Data

(63) Continuation of application No. 12/583,006, filed on Aug. 11, 2009, now Pat. No. 8,311,168, which is a continuation of application No. 11/358,901, filed on Feb. 21, 2006, now Pat. No. 7,573,966, which is a continuation of application No. 10/620,477, filed on Jul. 15, 2003, now Pat. No. 7,035,361.

(60) Provisional application No. 60/396,065, filed on Jul. 15, 2002.

(51) Int. Cl.
*H03D 1/06* (2006.01)

(52) U.S. Cl.
USPC ............ 375/348; 375/350; 375/229; 375/232

(58) Field of Classification Search
USPC .................................. 375/348, 350, 232, 229
See application file for complete search history.

(56) References Cited

U.S. PATENT DOCUMENTS

| | | | |
|---|---|---|---|
| 6,873,704 B1 * | 3/2005 | Park | 379/406.08 |
| 2001/0043650 A1 * | 11/2001 | Sommer et al. | 375/232 |

* cited by examiner

*Primary Examiner* — Qutbuddin Ghulamali
(74) *Attorney, Agent, or Firm* — King & Spalding

(57) ABSTRACT

Processing a signal comprising signal distortions with filters. The filters comprise a first filter configured to a first time scale to compensate for signal distortions within respective symbols of the signal and a second filter configured to a second time scale to compensate for signal distortions among symbols of the signal. A probability estimate is produced based on an output of at least one of the first and second filters. At least one of the first and second time scales is adjusted according to the probability estimate.

13 Claims, 14 Drawing Sheets

ADAPTIVE NOISE FILTERING AND EQUALIZATION

CROSS REFERENCE TO RELATED APPLICATIONS

The present application is a continuation under 35 U.S.C. §120 of U.S. non-provisional patent application Ser. No. 12/583,006, filed on Aug. 11, 2009, which is a continuation of U.S. non-provisional patent application Ser. No. 11/358,901, filed Feb. 21, 2006, now U.S. Pat. No. 7,573,966, which is a continuation of U.S. non-provisional application Ser. No. 10/620,477, filed Jul. 15, 2003, now U.S. Pat. No. 7,035,361, which claims priority under 35 U.S.C. §119(e) to U.S. provisional application No. 60/396,065. The entire contents of each of the above-recited patent applications is hereby incorporated herein by reference.

FIELD OF THE INVENTION

The present invention relates to communication systems and improving the received signal quality in a high-speed communications environment through the use of equalization. The improvement in signal quality affords gains in system performance such as increased data throughput capacity or reduced error rate. Specifically, the present invention relates to a method and system for improving the quality of a received signal by counteracting distortions introduced in signal generation, transmission, and reception.

BACKGROUND OF THE INVENTION

Network bandwidth consumption is rising at a rapid rate. Existing network capacity is marginally adequate and is expected, as of this writing, to soon be inadequate. Thus, there is a need to increase network bandwidth capacity. This increase in bandwidth can be achieved by increasing the symbol transmission rate to yield a corresponding increase in the data rate or by using advanced modulation techniques with higher spectral efficiency (i.e. techniques that communicate more than one information bit per symbol).

Regardless of the technique employed to achieve higher data throughput, the higher data throughput can place more stringent requirements on the fidelity of the signal communicated. Fidelity of the signal communicated can be hampered by signal degradation. Signal degradation can occur during signal generation and signal transmission. Signal degradation incurred in generating and transmitting a signal over a channel can largely be categorized as arising from two sources: (i) filtering of the signal and (ii) corruption from noise.

In classical communications (e.g. wireless or wireline communications), the noise component is commonly addressed by using optimal detection (i.e. matched-filtering followed by optimal thresholding). However, such a conventional approach often neglects the inter-symbol interference (ISI) associated with the filtering that occurs in the channel, i.e. that approach assumes that the noise is the dominant source of distortion. If the ISI is the dominant source of signal degradation, then the conventional approach is to equalize the channel, e.g. filter the received signal with an inverse filter prior to detection. The use of any one of these approaches in isolation may not improve signal fidelity since matched-filtering and equalization are often contradicting goals.

For example, equalization generally corresponds to high-pass filtering which, while removing ISI, increases the presence of high-frequency noise. A low-pass filter (LPF) is usually employed to the equalized signal in order to reduce the effect of the high-frequency noise but which also re-introduces ISI. Matched-filtering, on the other hand, is often low-pass in nature and thus frequently exacerbates the ISI in the signal in the process of reducing noise.

The separate application of matched-filtering and equalization can be characterized as "ad-hoc" because it does not consider the problem of noise mitigation and equalization in a combined framework, and thus, neglects the impact each has on the other.

There exist techniques in the conventional art which address noise mitigation and equalization in a common framework. In particular, the well-known Least-Mean Squares (LMS) based approaches minimize a distortion measure that captures the impact of both noise and ISI. Furthermore, these methods are adaptive in the sense that the settings of the filter are automatically adjusted to the optimal value. This adaptive feature is often necessary as the exact characteristics of the channel distortion and noise spectral content vary from installation to installation and also with time and temperature in some instances.

Unfortunately, the use of these traditional adaptive LMS-based control methodologies for high-data rate systems can be impractical due to data acquisition and processing difficulties. In particular, it can be economically impractical (and often technically infeasible) to (i) produce the analog-to-digital converters (ADC's) capable of digitizing the signal at the required speed and resolution and (ii) produce a processor capable of handling the digitized data at the high speeds.

Therefore, there is a need in the art for an adaptive filtering approach that combines channel equalization and noise filtering. Another need exists in the art for a method and system for high speed digital communications that combines channel equalization and noise filtering in a single framework and that can account for the effects that equalization can have on noise filtering, and vice-versa. Additionally, there is a need for such a method and system which is economically and technically practical for high-speed data systems.

SUMMARY OF THE INVENTION

A Signal Conditioning Filter (SCF) and a Signal Integrity Unit (SIU) can control elements that filter a digital (i.e. binary or multilevel) signal. A multilevel signal uses discrete amplitudes, which can change from one time interval to another, to convey information in each time interval. The simplest example of multilevel signaling is binary signaling where two amplitudes are used to represent a logical 0 or 1 (i.e. one bit of information). By using more levels, more information can be conveyed with each symbol or in each time interval. In some of the prior art and conventional art, the term "multilevel" conveys the use of more than two amplitude levels. To avoid any ambiguity, the term "digital signaling" will be used in this writing to refer to signaling with discrete amplitudes and time intervals, i.e. digital signaling that can include both binary and multilevel signaling.

The SCF and SIU form part of a method and system for equalizing and filtering a digital signal. This method and system for equalizing and filtering may be used in a variety of high-speed communications systems. Applications can include, but are not limited to, (i) electrical systems such as backplane, telecom, and datacom systems and (ii) optical systems such as long-haul, metro, and short-reach applications.

Regardless of the application, the method and system can process a received digital signal in the electrical domain prior to decoding. Thus, in optical systems, the method and system can be used either after photodetection in the receiver or prior to modulation in the transmitter.

The present invention can address the coupled problem of equalization and noise filtering in order to improve signal fidelity for decoding. Specifically, a received digital signal can be filtered in a manner to optimize the signal fidelity even in the presence of both significant (large magnitudes of) ISI and noise. Furthermore, the method and system of the present invention can be adaptive in the sense that filter coefficients can be continuously updated to reflect any time-varying changes in the system characteristics.

The present invention can provide an adaptive method that continuously monitors a signal fidelity measure. For example, monitoring the fidelity of a digital signal can be performed by external means such as a Signal Integrity Unit (SIU). A received signal y(t) can be "conditioned" by application of a filter with an electronically adjustable impulse response g(t). A resulting output z(t) can then be interrogated to characterize the quality of the conditioned signal.

This fidelity measure q(t) can then be fed back to the SCF. Utilizing the signal fed back to the SCF, the response of the SCF can be adjusted to maximize the received fidelity measure. For the SIU, the signal fidelity measure can be directly associated with a decision error probability in a subsequent decoder with optimal decision thresholds. Combining the proposed approach with such a control system can balance (in a principled fashion) the trade-off between the degree to which ISI is corrected and noise is mitigated for optimal decoding.

The SCF can include a cascade of two or more tapped delay line filters with electronically controllable gain coefficients. The tap spacings of the two filters can be different in order to effectively combat both the effect of ISI which occurs on a large time scale and the effects of noise, jitter, and signal ringing which occur on a small time scale.

Using a cascade of two distinct filters can minimize the number of taps required to address both of these phenomena. The delay lines in these filters can include artificial transmission lines which can absorb the parasitic capacitance of the tap amplifiers. The tap amplifiers which vary the gain coefficients can be implemented using special Gilbert cell multipliers.

For one aspect of the present invention, a series of symbols having a symbol period can be processed with filters. A first filter mitigates degradation within respective symbols of the series of symbols and a second filter mitigates inter-symbol interference among the series of symbols. The first filter includes delay elements, each having a delay less than the symbol period. The second filter includes delay elements each having a delay substantially equal to the symbol period. A probability estimate can be produced based on an output of at least one of the first and second filters. A delay for at least one of the delay elements of the first filter or the second filter can be adjusted according to the probability estimate.

For another aspect of the present invention, a signal comprising signal distortions can be processed with filters. The filters comprise a first filter configured to a first time scale to compensate for signal distortions within respective symbols of the signal and a second filter configured to a second time scale to compensate for signal distortions among symbols of the signal. A probability estimate can be produced based on an output of at least one of the first and second filters. At least one of the first and second time scales is adjusted according to the probability estimate.

For yet another aspect of the present invention, a digital signal is processed to reduce ringing, jitter, or noise within respective symbols of the digital signal. The digital signal is processed with a first filter stage including delay elements each having a first time constant less than a symbol period of the digital signal. Interference between symbols of the digital signal is reduced in response to processing the digital signal with a second filter stage including delay elements each having a second time constant greater than the symbol period. A probability estimate can be generated from an output of the first filter stage or the second filter stage. At least one of the first time constant and the second time constant can be refined based on the probability estimate.

DETAILED DESCRIPTION OF THE EXEMPLARY EMBODIMENTS

The present invention can address the problems of equalization and noise filtering in order to improve signal fidelity for decoding. Specifically, a received digital signal can be filtered in a manner to optimize the signal fidelity even in the presence of both large magnitudes of ISI and noise. Furthermore, the method and system of the present invention can be adaptive in the sense that filter coefficients can be continuously updated to reflect any time-varying changes in the channel behavior.

Filter Structure

Figure 1A:
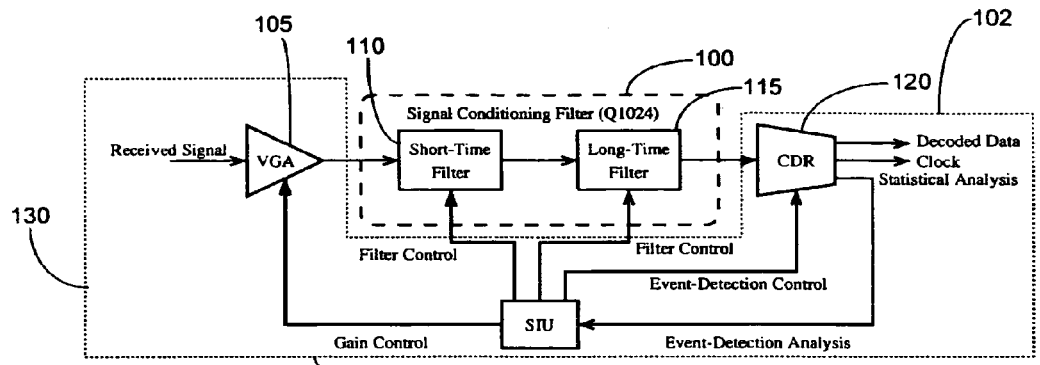
FIG. 1A illustrates a digital signal receiver architecture according to one exemplary embodiment of the present invention.

Referring now to FIG. 1A, an equalization and filtering system 102 can comprise a variable gain amplifier 105, a signal conditioning filter (SCF) 100, a decoder or clock and data recovery (CDR) unit 120, and a signal integrity unit (SIU) 125. The CDR 120, SIU 125, and VGA 105 can form parts of a signal detection and fidelity characterization circuit 130 as will be discussed below with respect to FIG. 2. The exemplary signal conditioning filter (SCF) 100 can comprise two filters, a short-time filter 110 and a long-time filter 115 that are cascaded together.

According to one exemplary embodiment, each filter 110, 115 of the signal conditioning filter 100 can comprise a tapped-delay line or finite impulse response (FIR) filter with electrically controllable gain coefficients. Filtering is separated into these two stages, where the short-time filter 110 can comprise the first stage and the long-time filter can comprise the second stage. Each stage is designed to address a particular type of distortion using a relatively small number of taps.

As its name implies, the short-time filter 110 can be designed to mitigate degradations such as ringing, noise, and timing jitter that can occur on a relatively small time scale. Meanwhile, the long-time filter 115 is designed to remove signal artifacts (such as ISI) that can occur on a larger time scale.

Figure 1B:
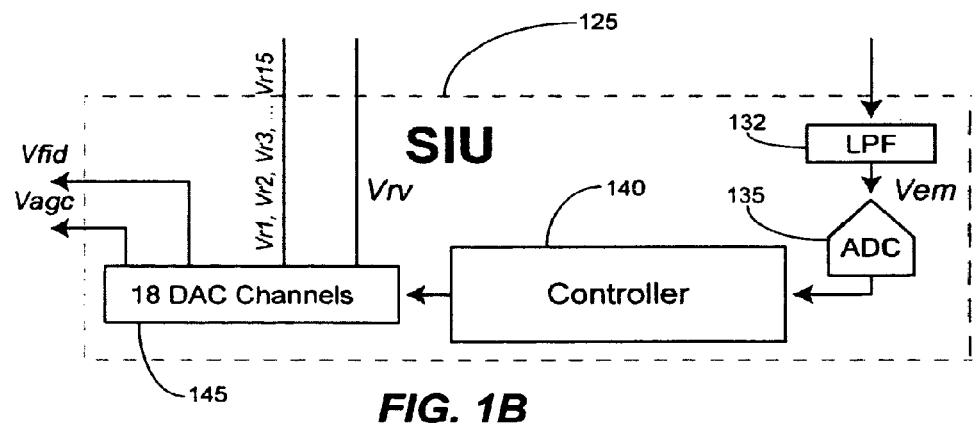
FIG. 1B illustrates a signal integrity unit according to one exemplary embodiment of the present invention.

Referring now to FIG. 1B, the signal integrity unit 125 can comprise a low pass filter (LPF) 132 and an analog-to-digital converter 135, a controller or processor 140, and a plurality of digital-to-analog converters (DACs) 145. After low-pass filtering by the LPF 132, a DC component of the sampled signal remains and is termed the event monitor voltage and is an analog probability estimate for the controlled reference voltage exceeding the received signal y(t) where controlled reference voltage is generated by the digital-to-analog converters 145.

As mentioned above, the output of the LPF 132 can be fed to the analog-to-digital converter (ADC) 135. The ADC 135 may be characterized as a low-speed high-resolution ADC that measures the averaged event-detector output representing the cumulative distribution function (CDF) value. Specifically, the reference voltage is swept over a range of voltage levels while the ADC 135 samples the voltage from the filter 132 to produce an estimate of the CDF. The SIU 125 can set the reference voltage via the DAC 145 to a fixed value and then measures the averaged event detection output. The SIU 125 can then set the reference voltage to a different fixed value and measures another point of the CDF. This process is completed until the CDF curve is formed.

The ADC 135 feeds its output to a microcontroller 140. Microcontroller 140 can process the cumulative distribution function (CDF) to determine threshold voltage values for signal decoding, receiver gain for the variable gain amplifier 105, and filter coefficients for the SCF 100. The microcontroller 140 is responsible for feeding the filter coefficients to the SCF for equalizing and filtering the received signal. Further details of the signal integrity unit 125 are discussed in the commonly owned U.S. Non-provisional application Ser. No. 10/108,598 entitled, "METHOD AND SYSTEM FOR DECODING MULTILEVEL SIGNALS," filed on Mar. 28, 2002 in the name of Vincent Hietala et al., the entire contents of which are hereby incorporated by reference.

Figure 2:
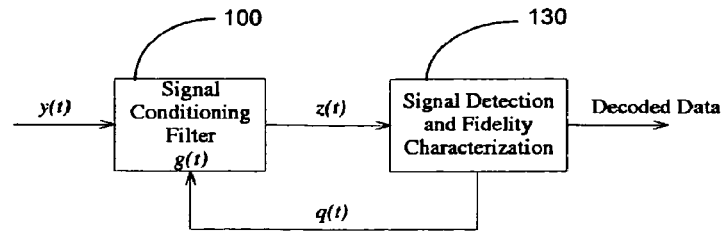
FIG. 2 illustrates an equalization architecture according to one exemplary embodiment of the present invention.

Referring now to FIG. 2, a first input to the signal conditioning filter (SCF) 100 can comprise a signal y(t) that can include an unfiltered received signal while the output to the SCF 100 can comprise a filtered signal z(t). The filtered signal z(t) can be propagated into the signal detection and fidelity characterization circuit 130. As mentioned above, the signal detection and fidelity characterization circuit 130 can comprise a CDR 120 and SIU 125.

A first output of the signal detection and fidelity characterization circuit 130 can comprise the decoded data from the filtered signal z(t). A second output of the signal detection and fidelity characterization circuit 130 can comprise a control signal q(t) that forms a second input to the SCF 100.

Figure 3:
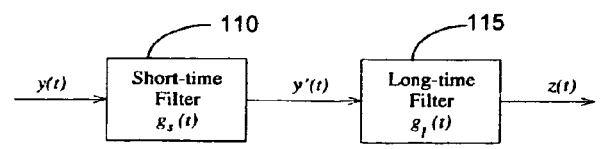
FIG. 3 illustrates a short-time filter and a long-time filter that form a signal conditioning filter according to one exemplary embodiment of the present invention.

Referring now to FIG. 3, as noted above with respect to FIG. 1, the SCF 100 can comprise a short-time filter 110 that receives the signal y(t) discussed above with respect to FIG. 2. The short-time filter 110 manipulates the signal y(t) according to a first function $g_S(t)$. The output from the short-time filter 110 can comprise a first filtered signal y-prime'(t) that is fed as the input to the long-time filter 115.

The long-time filter 115 manipulates the signal y-prime'(t) according to a second function $g_L(t)$. The output from the long-time filter 115 can comprise a second filtered signal or z(t) as mentioned above with respect to FIG. 2 that is fed as the input to the CDR 120 or SIU 125 (not shown in FIG. 2).

Figure 4:
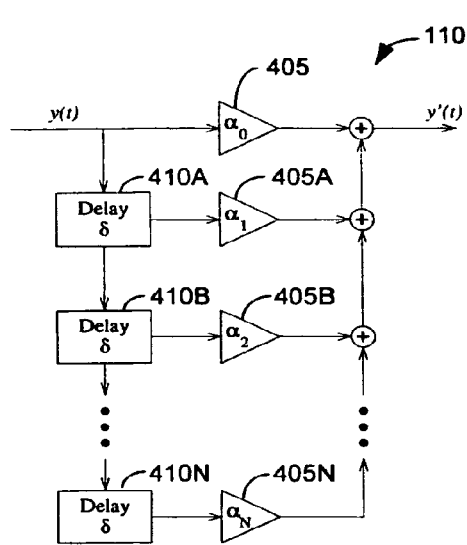
FIG. 4 illustrates a short-time filter in the form of a tapped-delay line filter with small tap delays less than a symbol period of a digital signal according to one exemplary embodiment of the present invention.

Referring now to FIG. 4, the exemplary short-time filter 110 can comprise a tapped-delay line filter with amplifiers 405 and N delay elements 410 (each with delay δ) and N+1 amplifiers with gain coefficients $\alpha_n$ for n=0, ..., N. The delay δ can be chosen to be small (relative to the symbol period $T_0$ of the signal) to permit the short-time filter 110 to perform at least one of three functions: (1) compensate for signal distortions (such as ringing) that can occur within a single symbol period; (2) effectively integrate over less than a symbol period to integrate out and reduce the noise; and (3) adjust the amount of signal smoothing to be large enough to reduce the effects of signal distortion and noise but to be short enough to be robust relative to the timing jitter in the system.

The short-time filter 110 can support a frequency resolution of 1/Nδ. It is assumed that the delay δ is sufficiently small so that there is no aliasing in the short-time filter 110. Specifically, the short-time filter 110 has a frequency response that is periodic in frequency with period 1/δ. Any signal (or noise) energy at frequencies higher than f=1/(2δ) will distort the filtered signal as they overlap into adjacent spectral periods. Because of this distortion, it is recommended that the signal be pre-filtered with a passive analog low-pass filter (not shown) prior to the short-time filter 110. This pre-filtering may not be needed if any of the receiver components already sufficiently bandlimits the signal, as is often the case with circuit hardware and the high speeds considered.

The output of the short-time filter 110 can be written as $$y'(t)=\alpha_0 y(t)+\alpha_1 y(t-\delta)+ \ldots +\alpha_N y(t-N\delta) \quad (1)$$

or equivalently as $$y'(t)=[\alpha_0+\alpha_1+ \quad . \quad . \quad . \quad +\alpha_N]y(t)-\alpha_1[y(t)-y(t-\delta)]- \ldots - \alpha_N[y(t)-y(t-N\delta)] \quad (2)$$

where the latter form explicitly conveys how the short-time filter 110 operates on the difference between the current sample and a sample from the past, i.e. each term can provide a first-order correction for the signal fluctuation within a symbol period. Furthermore, the coefficient on y(t) in Eq. (2) provides the DC gain of the signal, i.e. the gain on the signal when the signal is already flat within a symbol period, and hence, all the differential terms are zero. As a reference, unity DC gain can be chosen by setting $\alpha_0$ to $$\alpha_0=1-\alpha_1- \ldots -\alpha_N \quad (3)$$

or by alternatively normalizing the filter coefficients to sum to one.

Figure 5:
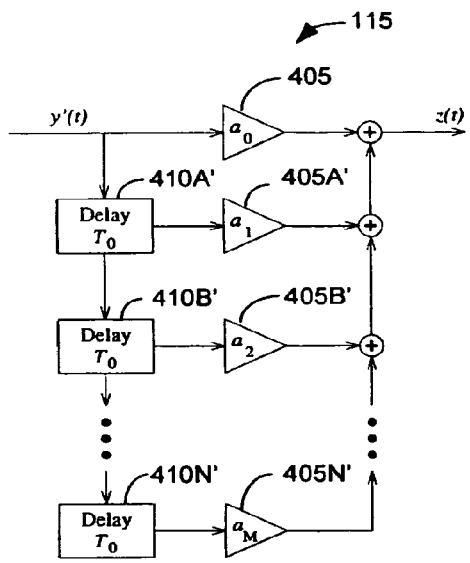
FIG. 5. illustrates a long-time filter in the form of a tapped-delay line filter with delays substantially equal to the symbol period according to one exemplary embodiment of the present invention.

Referring now to FIG. 5, the exemplary long-time filter 115 can comprise a tapped-delay line filter with M delay elements 410' (each with a delay equal to the symbol period $T_0$) and M+1 amplifiers 405 with gain coefficients $a_m$ for m=0, ..., M. The purpose of this long-time filter 115 is to remove ISI which occurs between symbols. Because the short-time filter 110 is capable of smoothing the signal over a significant portion of the symbol period, the long-time filter 115 need not worry about aliasing associated with the signal frequencies higher than the sampling rate $1/T_0$. If the short-time filter 115 were not present, then an anti-aliasing filter with a low-cutoff frequency may be needed.

Similar to Eqs. (1) and (2), the output of the long-time filter 115 can be written as $$z(t)=a_0 y'(t)+a_1 y'(t-T_0)+ \ldots +a_M y'(t-MT_0) \quad (4)$$

or equivalently, $$z(t)=[a_0+a_1+ \quad . \quad . \quad . \quad +a_M]y'(t)-a_1[y'(t)-y'(t-\Delta)]- \ldots -a_M[y'(t)-y'(t-M\Delta)] \quad (5)$$

where again, a unity DC gain can be arbitrarily chosen by setting $$a_0=1-a_1- \ldots -a_N \quad (6)$$

or by scaling the coefficients to sum to one.

Those skilled in the art can extend the exemplary filters in FIGS. 4 and 5 to account for subsequent as well as preceding signal samples. For example, additional L taps could be added to the short-time filter 110 of FIG. 4 to change Eq. (2) to yield $$y'(t)=[\alpha_0+ \ldots +\alpha_{N+L}]y(t)-\alpha_1[y(t)-y(t-\delta)]- \ldots -\alpha_{N+L}[y(t)-y(t-(N+L)\delta)].$$

The signal sample y(t−Lδ) can be interpreted as the sample to be decoded, i.e. where the decoding has been delayed by process by time Lδ. Because, the signal points y(t) through y(t−(L−1)δ) precede y(t−Lδ), the ISI associated from these symbols can be removed. Thus, the short-time filter 110 can now remove ISI originating from both preceding and succeeding signal samples. The long-time filter 115 may be similarly modified. This extension can be applied to both the short and long-time filters 110, 115 in practice as it can help improve equalization.

Filtering in the Transmitter

Figure 6:
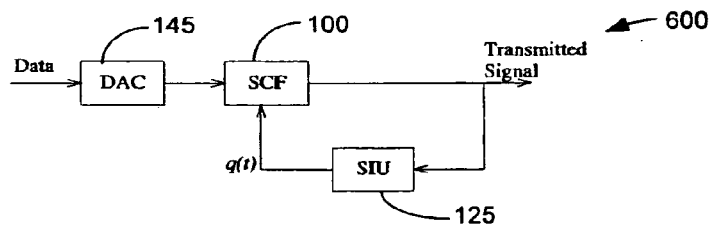
FIG. 6 illustrates a signal conditioning filter (SCF) forming part of a communications transmitter according to one exemplary embodiment of the present invention.

Referring now to FIG. 6, although described for use in a receiver, the SCF 110 may also be used in a transmitter 600 to maximize the fidelity of the transmit signal before channel noise is introduced which limits signal restoration in a corresponding receiver (not shown). Specifically, SCF 100 and SIU 125 modules may be placed in the transmitter 600 immediately before transmission circuitry as illustrated in FIG. 6 where these modules can be used to minimize the effects of ringing, ISI, circuit impedance mismatches, and noise introduced by the transmitter.

Removing these distortions prior to transmission is advantageous because the noise introduced by the channel limits the degree to which the transmitter 600 distortions can be compensated by the receiver's SCF 100. Additionally, if a supervisory communications link is available between the transmitter 600 and receiver (not shown), then the fidelity signal q(t) may be fed from the receiver (not shown) to the transmitter 600 over this link so that the SCF 100 in the transmitter not only compensates for transmitter distortions, but also pre-compensates for link distortions. This pre-compensation would be advantageous because it prevents the noise introduced by the link from limiting the degree to which the channel distortions can be compensated.

Filter Realization

Figure 7:
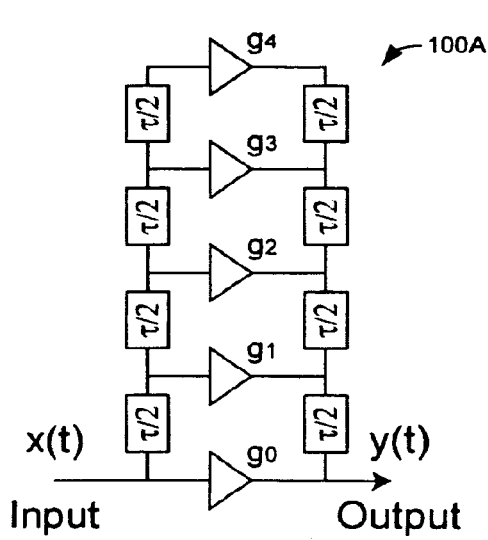
FIG. 7 is a functional block diagram illustrating a tapped-delay line filter according to one exemplary embodiment of the present invention.

The exemplary short- and long-time filters 110, 115 forming the SCF 100 can be implemented using an integrated tapped-delay line filter structure 100A with the basic structure illustrated in FIG. 7. This exemplary filter structure 100A is functionally identical to the conceptual tapped-delay line filter diagrams of FIGS. 3 and 4 if τ is associated with δ for FIG. 4 and $T_0$ for FIG. 5.

The filter structure 100A shown in FIG. 7 offers efficient "re-use" of the time delays for the various signal paths. This can be important since time delays are generally physically quite large and thus difficult to integrate. Therefore, it is desirable to make optimal use of all delay elements.

Figure 8:
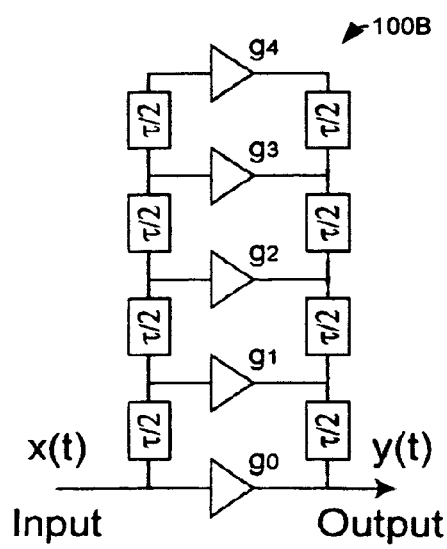
FIG. 8 is a functional block diagram illustrating a tapped-delay line filter and one of the exemplary signal paths according to one exemplary embodiment of the present invention.

To understand this efficient "re-use" of the delays, shown in FIG. 8 is the signal path for the third filter tap with gain coefficient g3. For this tap, by inspection, the total signal delay will be six times (×) τ/2 or 3τ. Similarly, by observation, the delay of the signal for each tap $g_i$ is i (times)×τ. Thus, the output signal y(t) can be represented as follows:

$$y(t) = \sum_{k=0}^{4} g_k x(t - k\tau), \quad (7)$$

which is identical to the form of Equations (1) and (4) discussed above.

Figure 9:
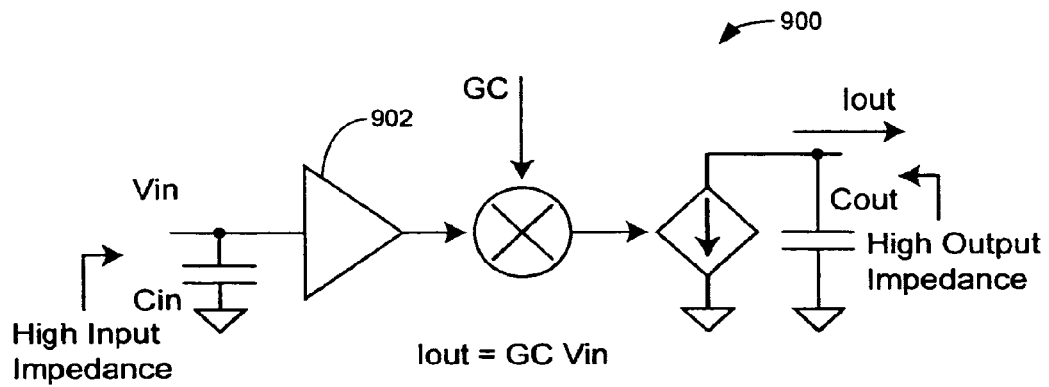
FIG. 9 is a functional block diagram illustrating a variable gain tap amplifier according to one exemplary embodiment of the present invention.

A block diagram of an exemplary variable gain tap amplifier 900 for a tap filter is illustrated in FIG. 9. In this exemplary embodiment, the gain constant GC is multiplied with the signal Vin to allow for both positive and negative gain coefficients. The input signal Vin is amplified/buffered, multiplied by the gain coefficient GC, and then output as a current source Iout. The input amplifier/buffer 902 is designed to have high input impedance as to not disturb the input delay line. The output of the amplifier 900 is also designed to be high impedance as to similarly not disturb the output delay line. In practice, a significant parasitic capacitance remains at both the input and output of the amplifier 900, but as will be seen below, these parasitics can be absorbed into the delay lines.

For one exemplary embodiment of the present invention, a delay element can comprise a simple LC (inductor-capacitor) delay line. However, those skilled in art will recognize that other delay elements can be used and are not beyond the scope and spirit of the present invention.

Figure 10:
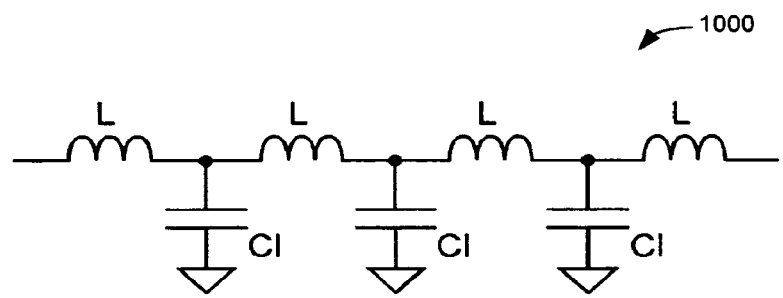
FIG. 10 is a circuit diagram illustrating a lumped LC delay line that has terminations provided on either end according to one exemplary embodiment of the present invention.

A representative LC delay line 1800 is illustrated in FIG. 10. This delay line 1000 forms a high order low-pass filter function with a relatively constant delay over the passband. Those skilled-in-the-art will recognize that a variety of filter design methodologies could be employed to construct higher performance delay structures, but the one shown in FIG. 10 was used for simplicity. It should also be realized that the lumped elements could be realized by distributed elements or in fact a variety of different delay elements could be similarly used.

For the simple delay structure shown, assuming constant L and $C_l$, the delay, τ is approximately:

$$\tau \approx N_{LC} \sqrt{LC_l} \quad (8)$$

in which $N_{LC}$ is the number of LC pairs and the filter's termination resistance, $R_o$ is:

$$R_o \approx \sqrt{\frac{L}{C_l}} \quad (9)$$

The end of each delay element needs to be terminated with $R_o$ in parallel with a capacitor of approximately $C_l/2$ for proper operation.

Figure 11:
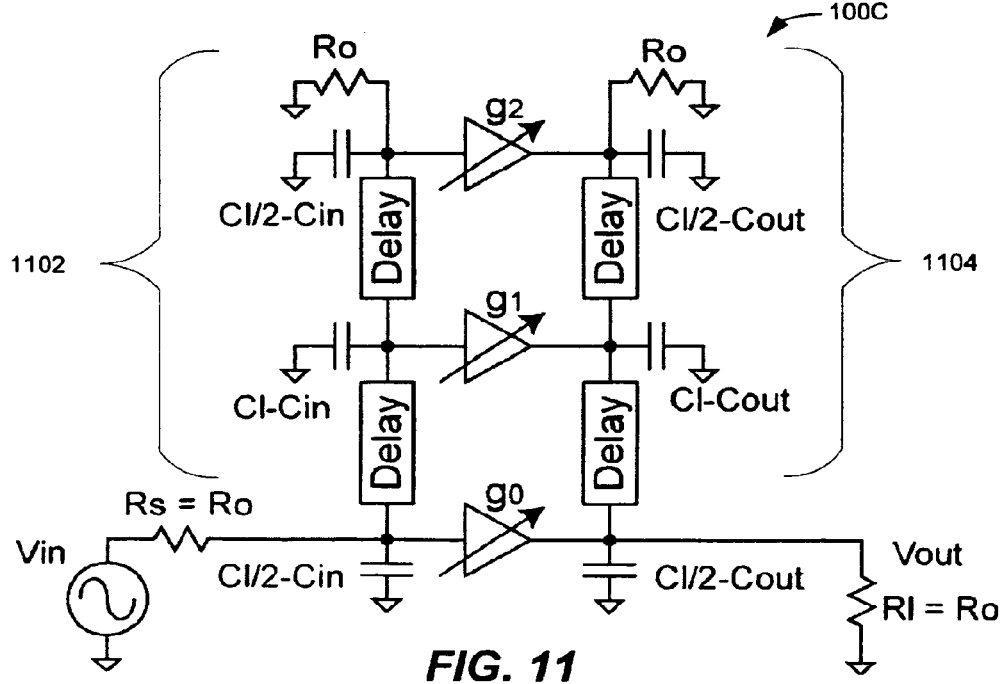
FIG. 11 is a circuit diagram illustrating an three-tap tapped-delay line filter having variable gain amplifiers described in FIG. 18 and delay blocks described in FIG. 19 according to one exemplary embodiment of the present invention.

Referring now to FIG. 11, an exemplary embodiment of a three tap tapped-delay line filter 100C using the variable gain tap amplifier of FIG. 9 and the lumped LC delay element shown in FIG. 10 is illustrated. Several important design aspects of this filter structure 100C can now be explained.

First, it is important to realize that the cascade of delay elements 1102 and circuitry on the left-hand side of the circuit 100C is designed to form a well controlled delay line. This will be referred to as the "input delay line" 1102. Similarly, on the right-hand side of the circuit 100C comprising the two delay elements and associated circuitry in this simple exemplary embodiment, will be referred to as the "output delay line" 1104.

Both the input and output delay lines 1102, 1104 are designed to have minimal signal attenuation and reflections in order to maintain good signal fidelity. As such, as already mentioned, the inputs of the amplifiers g were designed with high impedance and the remaining input capacitance is "absorbed" into the loading capacitance of the input delay line 1102.

This absorbed capacitance can be seen in FIG. 11 by the reduced values of loading capacitance ($C_l$–$C_{in}$). Additionally, the input and the output of the input delay lines 1102, 1104 are carefully terminated in the characteristic resistance ($R_o$) of the delay elements. Similarly, the output delay line 1104 absorbs the output parasitic capacitance of the amplifiers and is terminated with the appropriate resistance ($R_o$). The output of each amplifier g launches a signal in both directions in the output delay line 1104 and thus it can be appreciated why proper termination can be critical for proper filter operation.

FIGS. 12 through 15 illustrate an exemplary circuit embodiment of two tap tapped-delay line filters. The designs are fully differential, but one skilled-in-the-art will realize that the concepts discussed above are equally applicable to differential or single-ended designs. The particular exemplary embodiments illustrated in these figures are for integration in a GaAs HBT process. One skilled-in-the-art will realize that other device technologies could similarly be applied.

Figure 12:
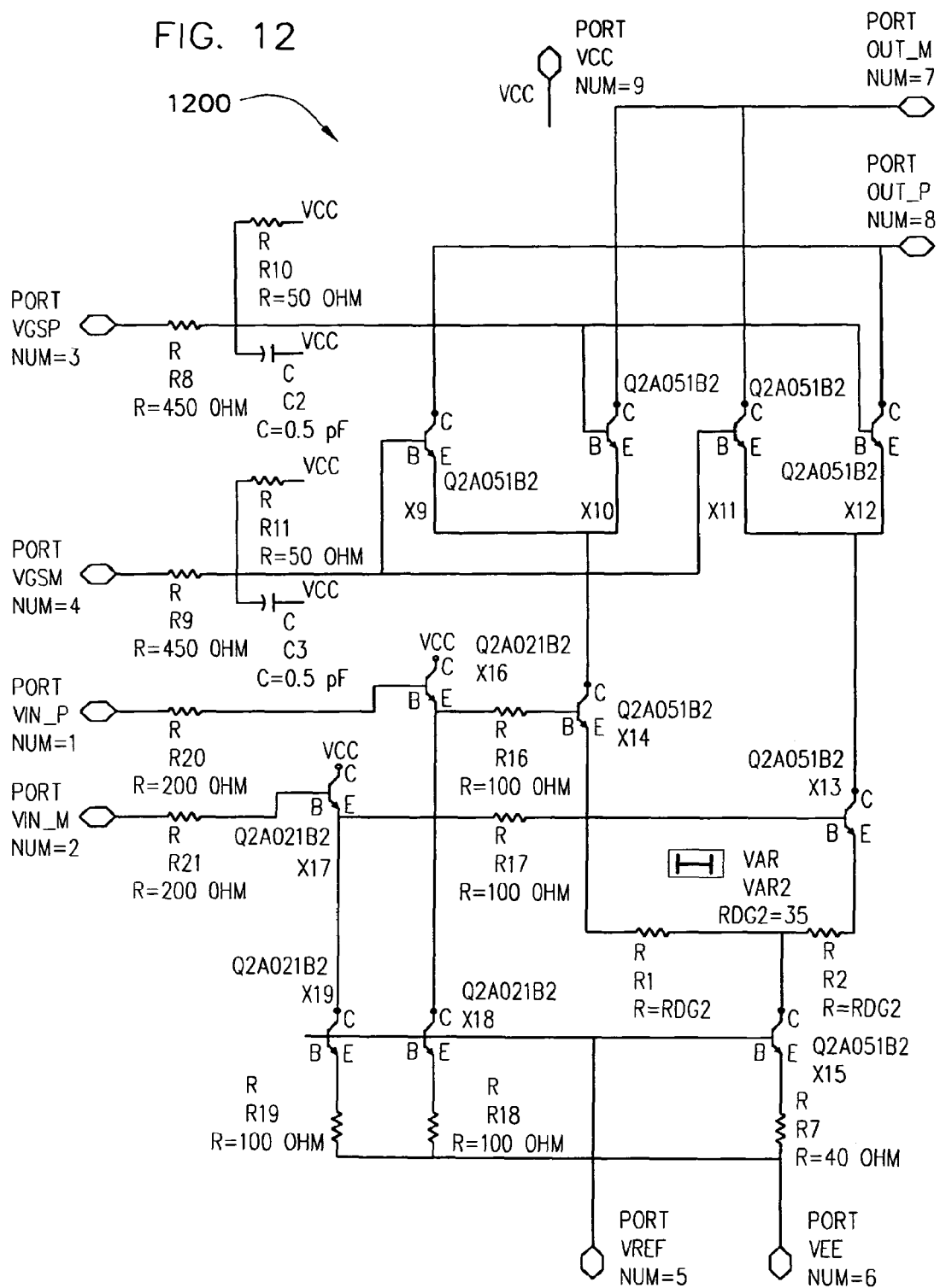
FIG. 12 is a circuit diagram of a variable gain tap amplifier according to one exemplary embodiment of the present invention.

Specifically, FIG. 12 illustrates the circuit diagram of an exemplary variable gain tap amplifier 1200. The input is first buffered by high input-impedance emitter follower amplifiers X16 and X17. The output of the emitter follower amplifiers drives a lower pair of a standard Gilbert cell multiplier circuit (also called a Gilbert cell mixer and an XOR gate) comprising X14, X13, X9, X10, X11 and X12. The bases of the upper cross connected differential pairs are held at the desired DC gain constant. Since this circuit is an effect 4-quadrant multiplier, the gain coefficient can be negative or positive.

The R8, R10 and R9, R11 resistor divider networks scale the input drive voltage so that desired coefficient control range is achieved (approx. +/–1 V in this case). The output of the Gilbert cell multiplier circuit is terminated by the output delay line. The Gilbert cell multiplier will usually see a real load resistance of $R_o/2$. The output will have a significant output capacitance due the collector capacitances of X9, X10, X11, and X12, but as discussed above, this capacitance can be absorbed into the output delay line.

Figure 13:
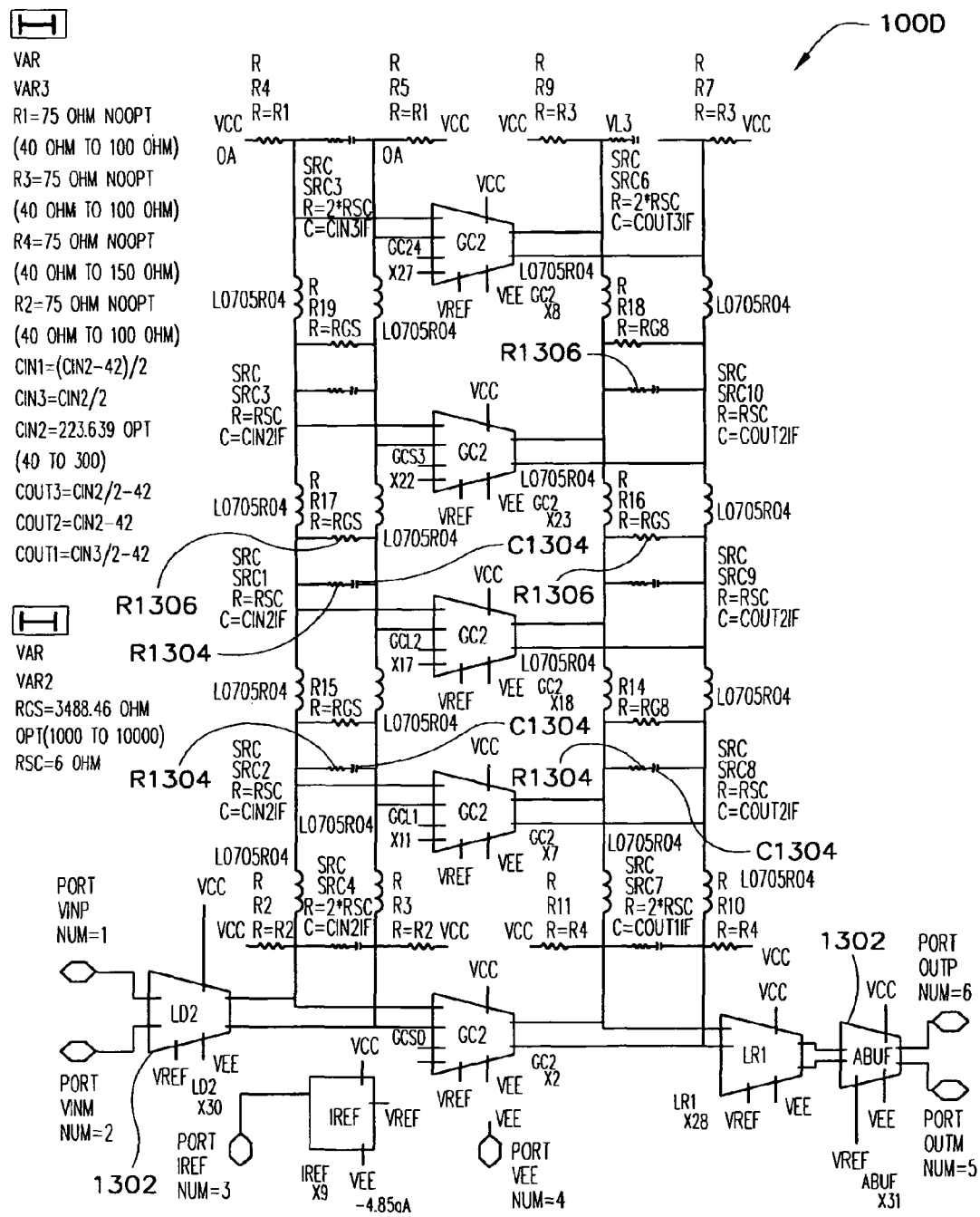
FIG. 13 is a circuit diagram of 5-tap tapped-delay line filter with artificial transmission lines according to one exemplary embodiment of the present invention.

Referring now to FIG. 13, the design for an exemplary 5-tap τ=$T_0/5$ short-time tapped-delay line filter 100D that is based on artificial transmission lines is illustrated. For this filter 100D, it was found that only one LC pair was required for each tap ($2^{nd}$ order low-pass filter). Each delay element can provide 37 (pico-seconds) ps of delay (½ of ⅕ period at 2.7 Gbps). The inductors used were integrated spiral inductors with a nominal inductance of 2.7 nH. The actual loading capacitor values were initially selected as indicated above, but optimized for the best frequency response in the actual design. A series resistance R1304 was added to the loading capacitors C1304 to lower the phase peaking at the stopband edge. An additional shunt resistance R1306 was added to help counteract the effect of the inductor loss Inductor loss makes the delay lines characteristic resistance complex. The addition of an appropriate shunt resistance can cancel this effect and make the characteristic impedance real at a target frequency. The input and output of the filter 100D are buffered by amplifiers 1302 to isolate the circuit from external influences.

Figure 14:
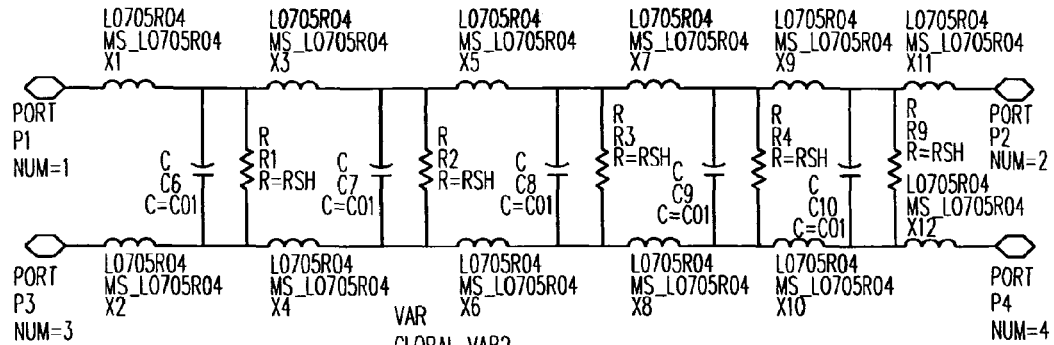
FIG. 14 is a circuit diagram of an exemplary long-time delay artificial transmission line according to one exemplary embodiment of the present invention.
Figure 15:
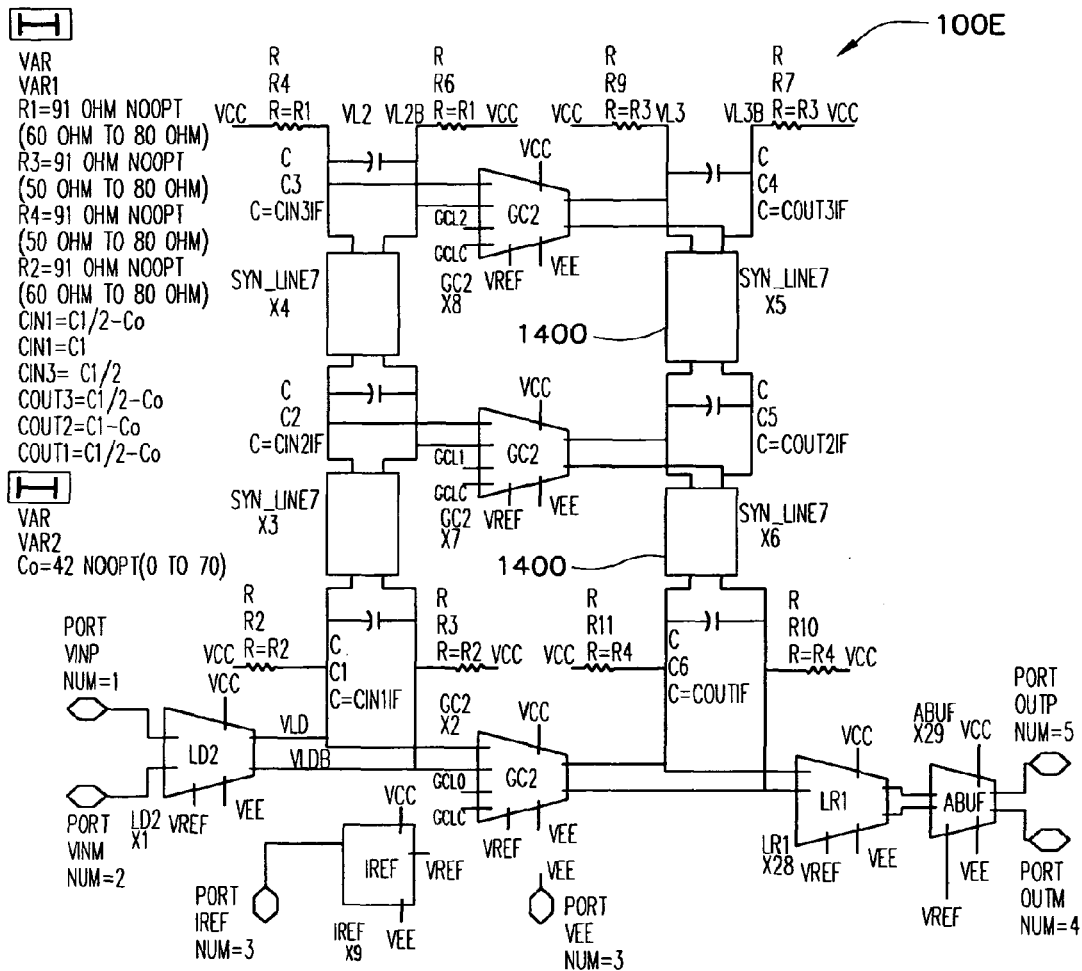
FIG. 15 is a circuit diagram of an exemplary three-tap tapped-delay line filter according to one exemplary embodiment of the present invention.

For the long-time filter 115 (3-tap $\tau=T_0$), a six stage LC filter was required to obtain the necessary delay of 185 ps. Referring now to FIG. 14, this figure illustrates an exemplary circuit of an individual long delay element 1400. Four of these long delay elements 1400 were used in the exemplary filter embodiment 100E illustrated in FIG. 15. The exemplary filter embodiment 100E of FIG. 15 can be referred to as a 3-tap long-time tapped-delay line filter.

Coefficient Adaptation Algorithm

The gains of the filter tap amplifiers g are adjusted to maximize a signal fidelity measure q(t) (provided by the SIU 125 for example). The general idea is to slightly perturb the coefficients and observe the effect on q(t). Doing this allows a set of coefficient values to be determined that locally maximizes the signal fidelity. The approach continually perturbs the coefficients to survey the signal fidelity's dependence on the coefficients and tune the SCF 100 to the optimal values in an adaptive fashion. The method is presented for the case of the short-time filter, but the approach is equally applicable to the long-time filter. Alternatively, the cascade of the two filters can be viewed as a single filter whose coefficients are adapted by the following method as will be discussed below.

The intuition in the preceding paragraph can be made precise by restating it as the following optimization problem $$\alpha^* = \underset{\alpha}{\mathrm{argmax}}\{q(t)\} \tag{10}$$

where $\alpha$ denotes the vector of adjustable filter coefficients and q(t) quantifies the fidelity of the signal (such as a measure of the signal's Q-factor as produced by the SIU[4]). Eq. (10) is solved via an empirical minimization of q(t). Towards this end, a coordinate descent algorithm can be used to find the local maximum by searching over each coordinate while the others are held fixed (i.e. perturbing one of the filter coefficients $\alpha_0, \alpha_1, \ldots, \alpha_N$ at a time). One skilled in the art will realize that other numerical optimization techniques (such as gradient, Newton, and conjugate methods) may also be used to solve Eq. (10).

In some contexts, simply maximizing the signal fidelity may not be sufficient to provide good SCF performance. In particular, there is the possibility of a null-space of solutions. For example, consider the task of short-time equalization when there is no ringing and noise on the received signal to compensate. An intuitive solution would be to have $\alpha_0=1$ and $\alpha_n=0$ for all other n, i.e. perform no filtering. However, an equally valid solution would be, $\alpha_0=1$, $\alpha_1=A$, $\alpha_2=-A$, and $\alpha_n=0$ for all other n where A can be any value (including arbitrarily large values). Other convoluted (but still valid) sets of coefficients can also be obtained. The drawbacks of such non-intuitive solutions are 1. They obscure the identifiability of the coefficients which are actually helping to improve signal fidelity. For instance, in the above example, $\alpha_1$ and $\alpha_2$ effectively cancel each other and do nothing to reduce ringing or noise.
2. They reduce the robustness of the system to changes in the channel characteristics. In particular, if the channel characteristics change such that the null-space "moves" (e.g. a little ringing is introduced), then $\alpha_1$ and $\alpha_2$ will no longer cancel each other and a very erratic signal will result until the coefficients are relearned to remove such artifacts.

Motivated by such problems, there may be the desire to guide the values of the filter coefficients $\alpha_n$, in addition to maximizing the signal fidelity. To achieve such a result, a regularization penalty can be imposed in the objective function. For example, solving the following optimization problem could be chosen in place of Eq. (10):

$$\alpha^* = \underset{\alpha}{\mathrm{argmax}}\{q(t)^2 - \gamma \|\alpha - \beta\|_2^2\} \tag{11}$$

where $\gamma$ and $\beta$ are regularization parameters. The parameter $\beta$ is a nominal value for $\alpha$. Specifically, $\beta$ is the value one would expect $\alpha^*$ to be in the absence of any channel distortion. While $\beta$ represents the nominal value of $\alpha^*$, $\gamma$ represents confidence in $\beta$ and determines how strongly $\alpha^*$ is driven towards $\beta$. Note that if no biasing is desired, then $\gamma$ should be set to zero, and Eq. (11) reduces to Eq. (10). Thus, Eq. (10) can be seen as a specific case of Eq. (11). One skilled in the art will realize that a variety of penalty functions can be used in place of the 2-norm in Eq. (11).

As previously stated, the long-time filter coefficients can similarly be adapted according to Eq. (11), i.e. it can be chosen that $$a^* = \underset{a}{\mathrm{argmax}}\{q(t)^2 - \gamma \|a - b\|_2^2\} \tag{12}$$

where b is the nominal value for the long-time filter coefficients. The nominal situation again corresponds to when the channel introduces no signal distortion. For example, if one generally believes the channel introduces no ISI, then b should generally resemble a Euclidean basis vector, i.e. a vector with a single 1 and the rest zeros. That is, the nominal long-time filter should not do much filtering.

Automatic Gain Control

Thus far, the special case of no DC amplification on the filtered multilevel signal has been considered. A non-unity gain could be selected. And if a variable gain amplifier (VGA) module 105 is to lead or follow the SCF 100, then the control of the VGA module 105 may be incorporated into the SCF's 100 control. In particular, if the desired gain $A_{VGA}$ can be obtained as an external signal (perhaps determined in the SIU 125, then the SCF 100 can control the gain by simply scaling all of the coefficients $\alpha_n$ (or $a_n$) by $A_{VGA}$. This is simply a mathematical operation that can be performed after the calculation of filter coefficients in Eq. (11) or (12). Alternately, the gain control of the VGA module 105 can be adjusted as needed by the SIU.

Simulation Results

To demonstrate results of the proposed filtering method, the inventors completed a MATLAB simulation as applied to real data of a 4-PAM signal in an optical communications system.

Figure 16:
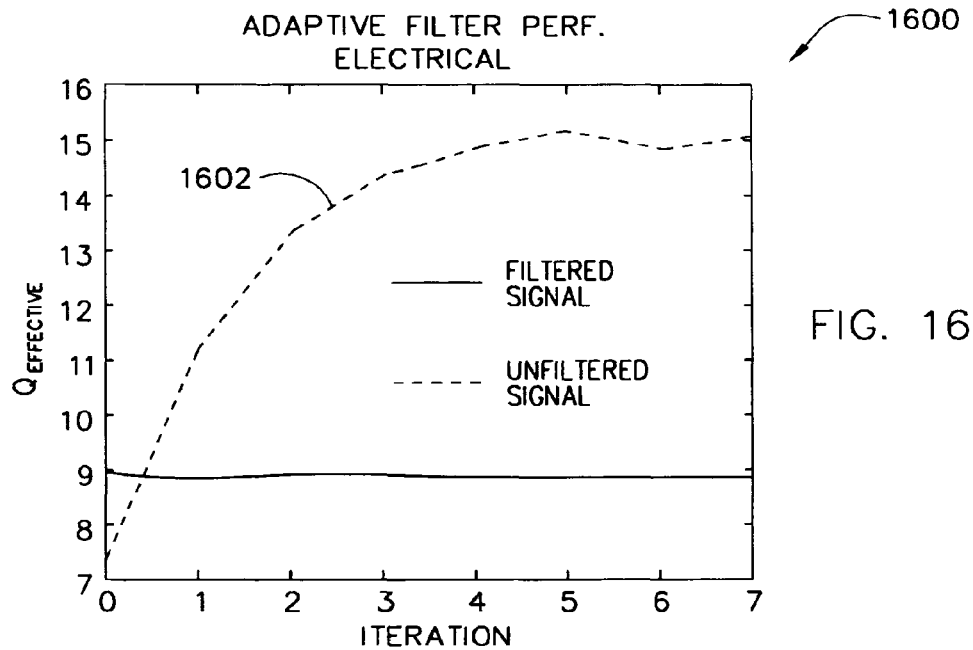
FIG. 16 is a graph that illustrates how the effective Q-factor varies with the initial iterations of the adaptive filter for an electrical multilevel signal according to one exemplary embodiment of the present invention.

First, a system dominated by short-time effects, i.e. ringing and noise, is examined. Specifically, an electrical drive signal and a received signal after 100 km of fiber is considered. The progression of the fidelity measure as the filter adaptation algorithm iterates is shown in FIG. 16 (for the electrical drive signal) and 17 (for the received optical signal). Specifically, the graph 1600 in FIG. 16 conveys the value of the signal fidelity measure as the filter coefficients are being adjusted.

Figure 18:
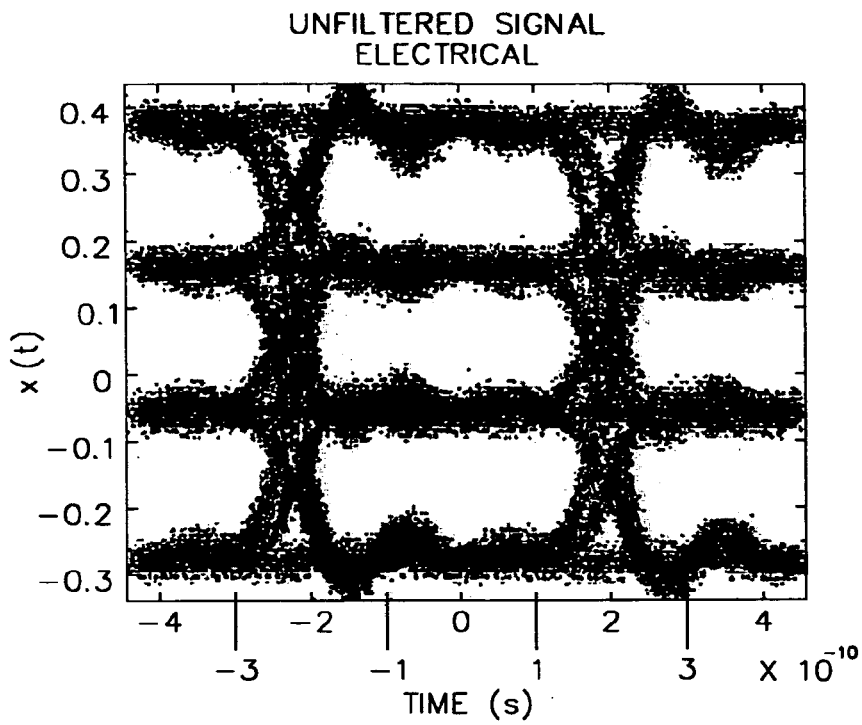
FIG. 18 is a graph of an Eye-diagram for an unfiltered multilevel electrical drive signal that can be used as an input to the present invention.
Figure 19:
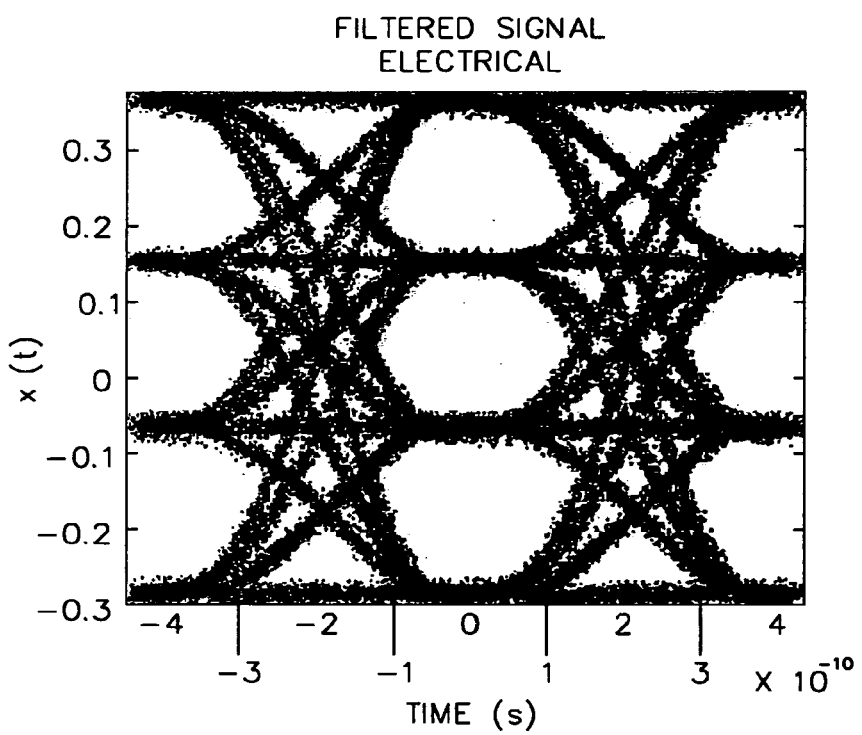
FIG. 19 is a graph of an Eye-diagram for a filtered multilevel electrical drive signal according to one exemplary embodiment of the present invention.

From the plot 1602, it can be seen that the fidelity of the signal is improved as the coefficients are adjusted. The numerical improvement conveyed by plot 1602 can be further appreciated by considering the eye-diagrams in FIGS. 18 and 19. FIG. 18 shows the eye diagram for the signal before any filtering, i.e. at iteration 0 in graph 1600. FIG. 19 shows the eye-diagram of the signal after filtering on iteration 7 in graph 1600. Clearly, the amount of ringing on the signal has been reduced through the use of filtering providing a better quality signal.

Figure 17:
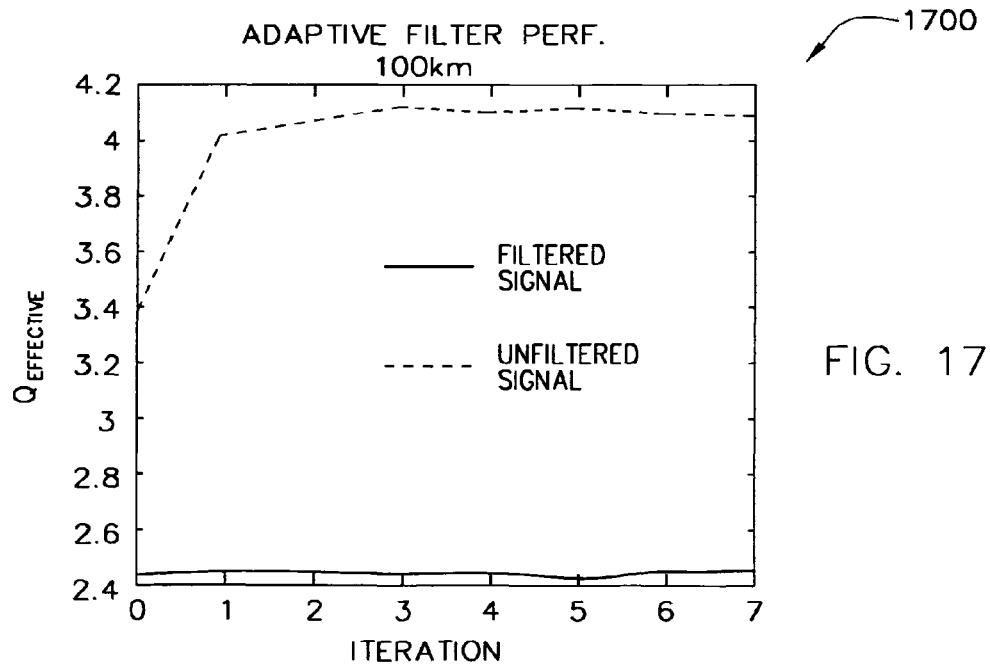
FIG. 17 is a graph that illustrates how the effective Q-factor varies with the initial iterations of the adaptive filter for a multilevel signal going through 100 km of fiber according to one exemplary embodiment of the present invention.
Figure 20:
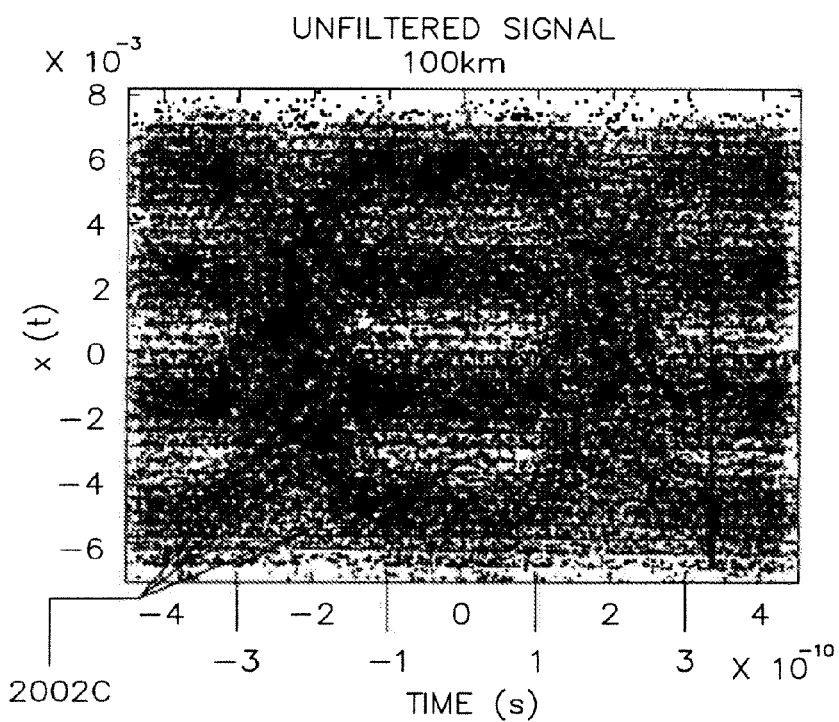
FIG. 20 is a graph of an Eye-diagram for an unfiltered multilevel optical signal that can be used as an input to the present invention.
Figure 21:
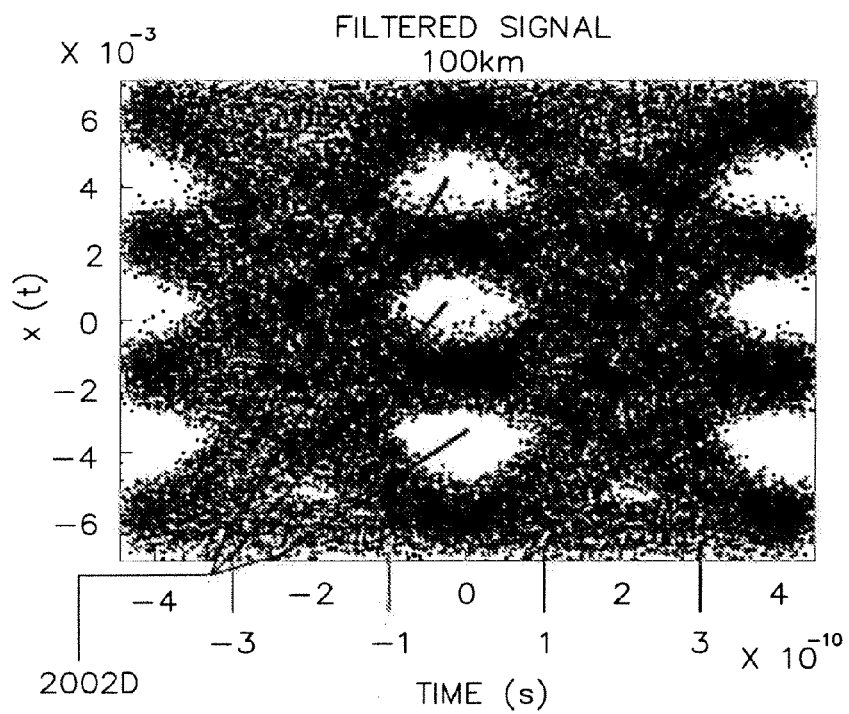
FIG. 21 is a graph of an Eye-diagram for a filtered multilevel optical signal according to one exemplary embodiment of the present invention.

FIG. 17 is analogous to FIG. 16, except that FIG. 17 is for a photodetected optical signal after 100 km of optical fiber. Specifically, graph 1700 in FIG. 17 shows the progression of the fidelity measure as the filter coefficients are adjusted in each iteration for this optical system. FIGS. 20 and 21 are analogous to FIGS. 18 and 19. In particular, FIG. 20 shows an eye-diagram of the photodetected optical signal before any filtering. Clearly, the signal is of poor quality as exhibited by the nearly closed eye-openings 2002C. FIG. 21, however, shows very wide eye-openings 2002D that are produced after filtering the signal with the described invention.

Figure 22:
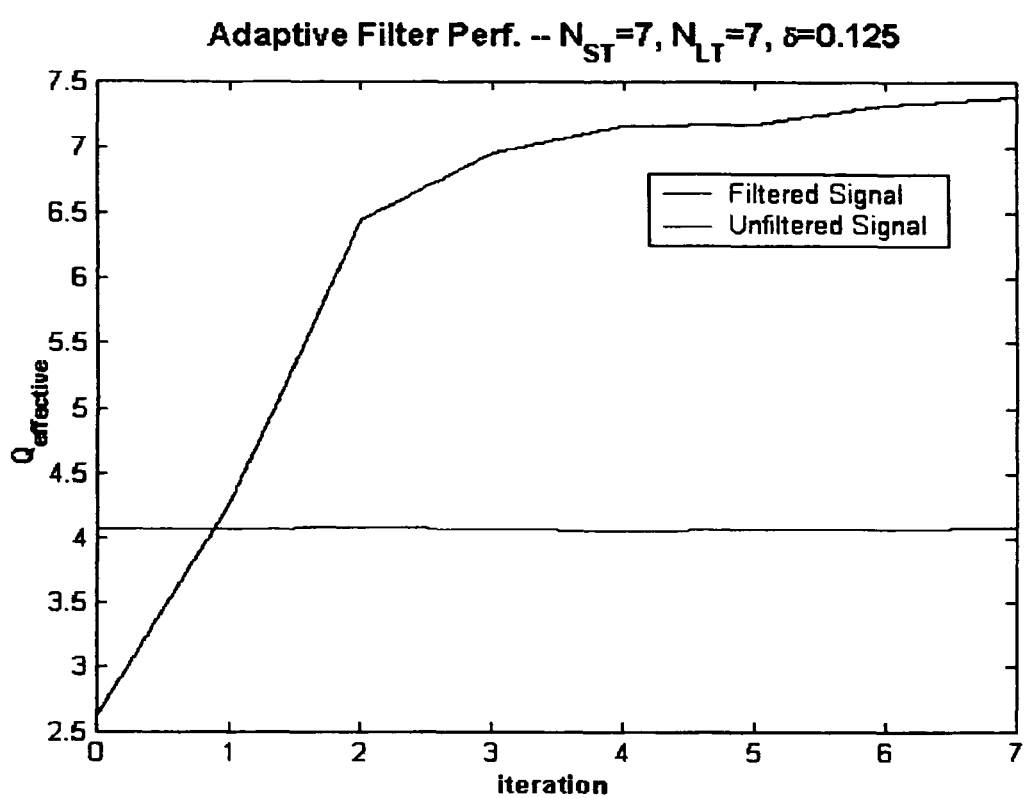
FIG. 22 is a graph illustrating how the effective Q-factor varies with the initial iterations of the adaptive filter for a multilevel signal with inter-symbol interference according to one exemplary embodiment of the present invention.
Figure 23:
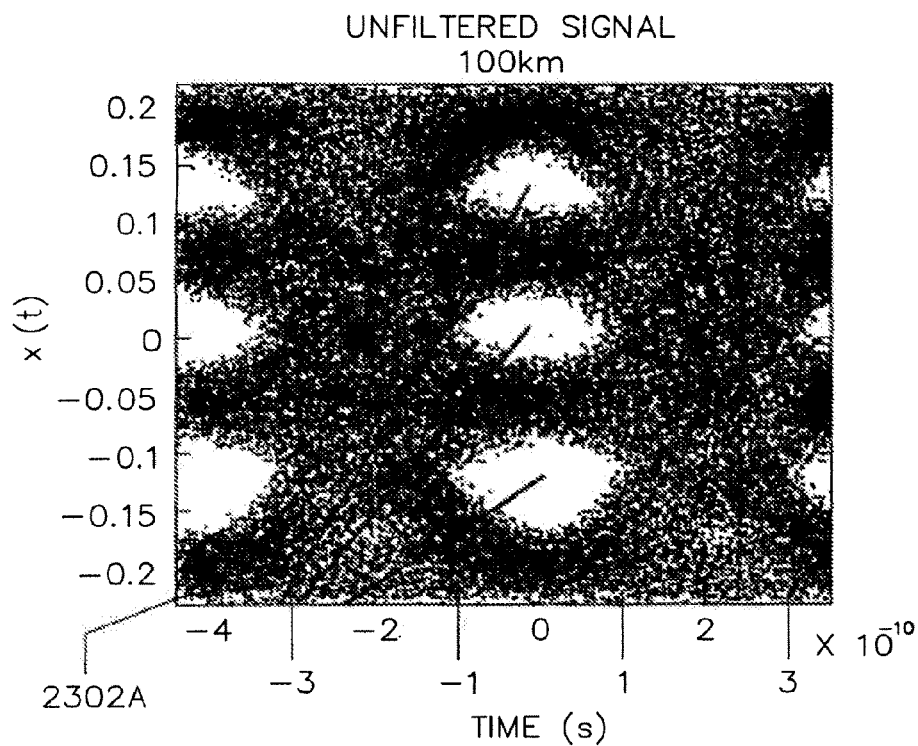
FIG. 23 is a graph of an Eye-diagram for an unfiltered multilevel optical signal that can be used as an input to the present invention.

In addition to the short-time distortion noise dominated data sets in FIGS. 16 through 22, another data set in which the signal is predominantly degraded by ISI is examined. Again, the context is an optical system with 100 km of fiber, but contrary to the system used for FIGS. 8, 11, and 12, a different photodetector is used which is less vulnerable to noise, thus leaving ISI as the dominant source of signal degradation. The evolution of the signal fidelity is shown in FIG. 22 from which we see a significant improvement in signal quality (almost doubling the fidelity measure). The eye-diagrams associated with the SCF are shown in FIG. 23 (without filtering) and 24 (with filtering). The increase in the eye-opening from before filtering 2302A to after filtering 2302B clearly conveys the improvement in signal quality afforded by the SCF.

Laboratory Results

An exemplary IC implements the filter embodiment discussed above, as illustrated by the circuit 2500 of FIG. 25. The circuit 2500 was fabricated in a GaAs HBT process. The short-time filter 2505 comprises five coefficient amplifiers 2510 and eight delay elements 2515 to realize the 5-tap tapped-delay line filter illustrated in FIG. 22. As previously described, a pair of τ/2 delay elements 2515 are used to produce the desired delay of τ (τ/2 from the input side and τ/2 from the output side).

Figure 24:
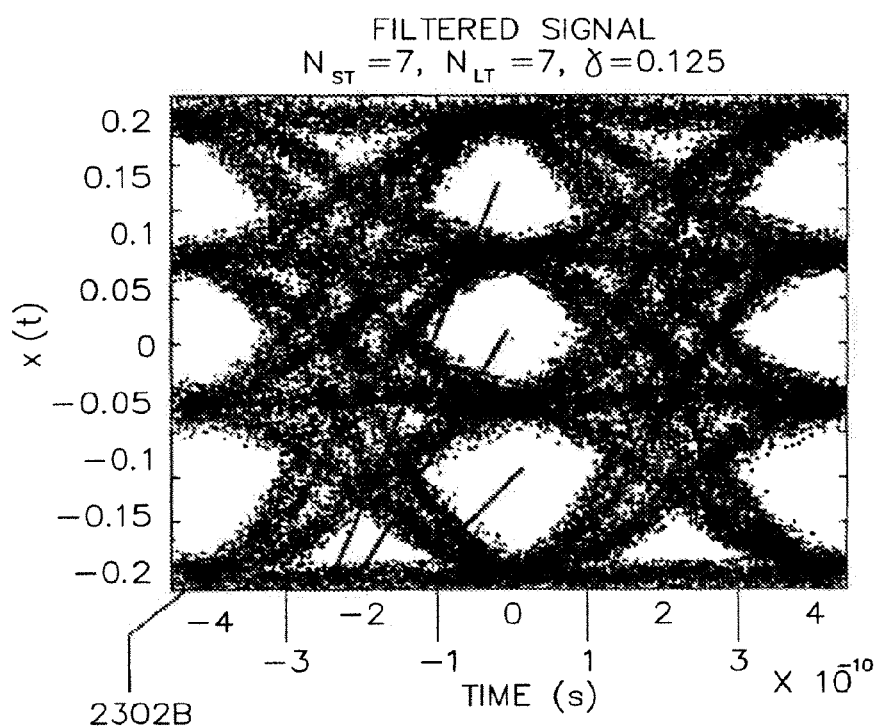
FIG. 24 is a graph of an Eye-diagram for a filtered multilevel optical signal according to one exemplary embodiment of the present invention.

Meanwhile, the long-time filter 2520 comprises three coefficient amplifiers 2510 and four delay elements 2525 to realize the 3-tap long-time filter illustrated in FIG. 24. Coefficient amplifiers 2510 are Gilbert cell multipliers with identical topologies, although specific circuit parameters may vary as each multiplier is optimized according to the surrounding circuit.

Figure 25:
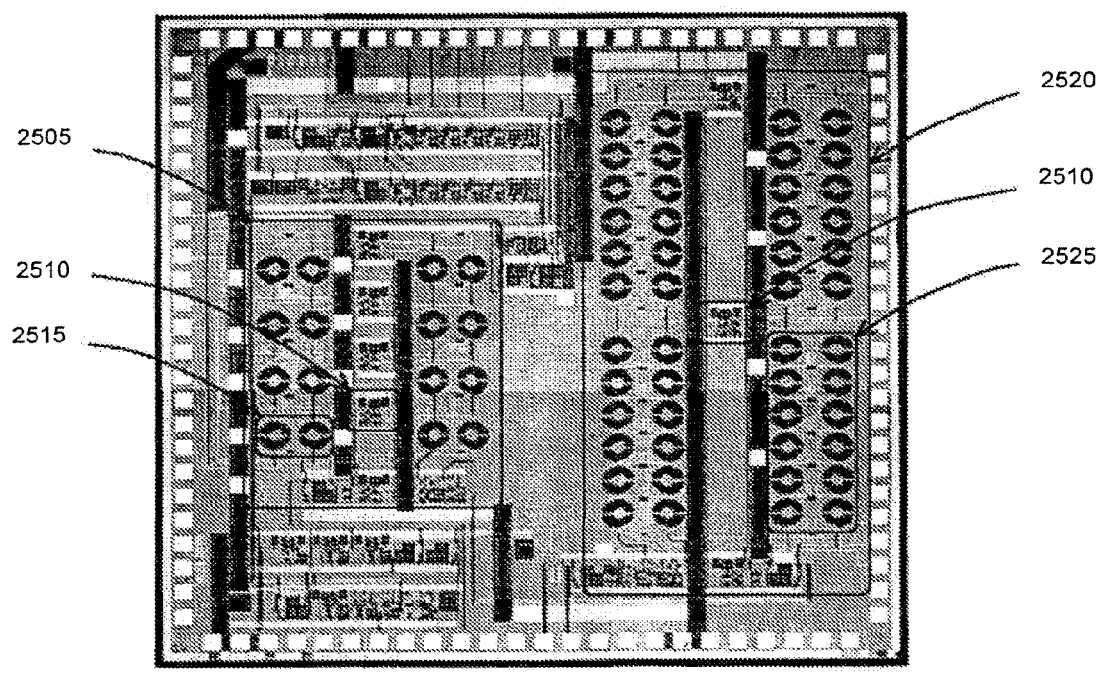
FIG. 25 illustrates a signal conditioning filter (SCF) fabricated in GaAs as an integrated circuit that contains a variable gain input amplifier and a transit detector circuit for clock recovery according to one exemplary embodiment of the present invention.
Figure 26:
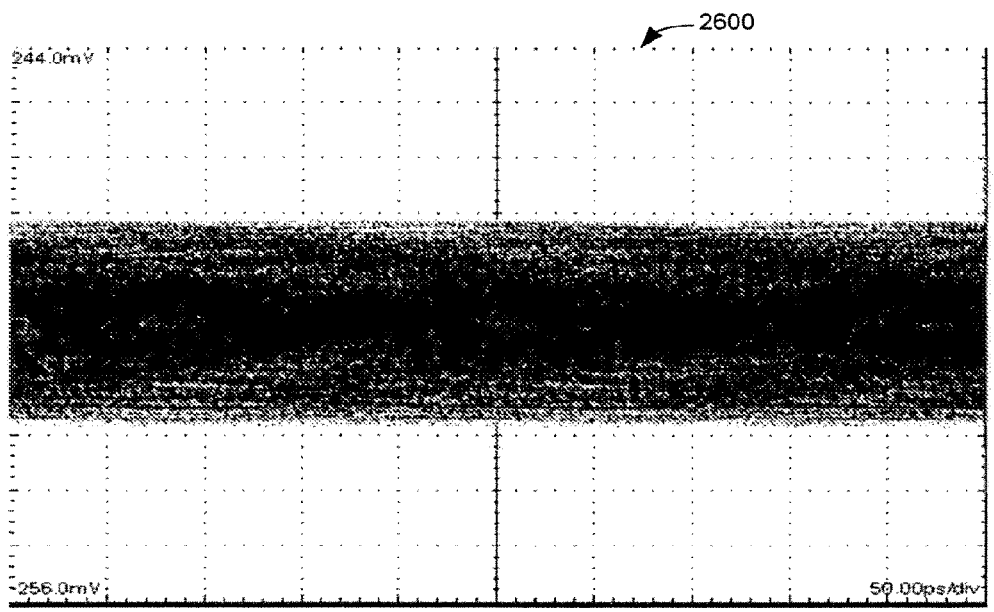
FIG. 26 is a graph that illustrates a 5 Gbps unfiltered binary signal after transmission over 34" of copper trace in a backplane that can used as input to the present invention.
Figure 27:
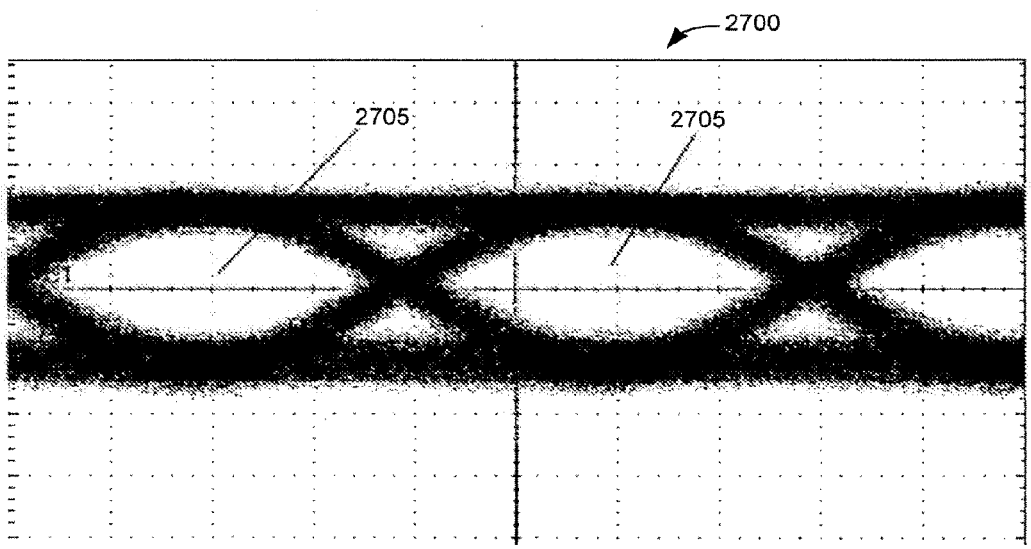
FIG. 27 is a graph that illustrates the signal of FIG. 26 after equalization with the signal conditioning filter according to one exemplary embodiment of the present invention.

The improved output provided by the SCF circuit 2500 of FIG. 25 is illustrated by FIGS. 26 and 27. FIG. 26 illustrates a received signal from a backplane communications system transmitting a binary signal at a data rate of 5 Gbps over a 34" copper trace. Specifically, FIG. 26 illustrates the condition of the received electrical binary signal in the form of an eye-diagram 2600. Clearly, no reliable data can be recovered from this received signal as there is no eye-opening.

Meanwhile, referring now to FIG. 27, this figure shows an eye-diagram 2700 for the same received signal illustrated in FIG. 26 but being processed by the SCF 100 and its corresponding control method. The eye-openings 2705 are now clearly visible affording reliable communications which was unachievable without equalization.

Figure 28:
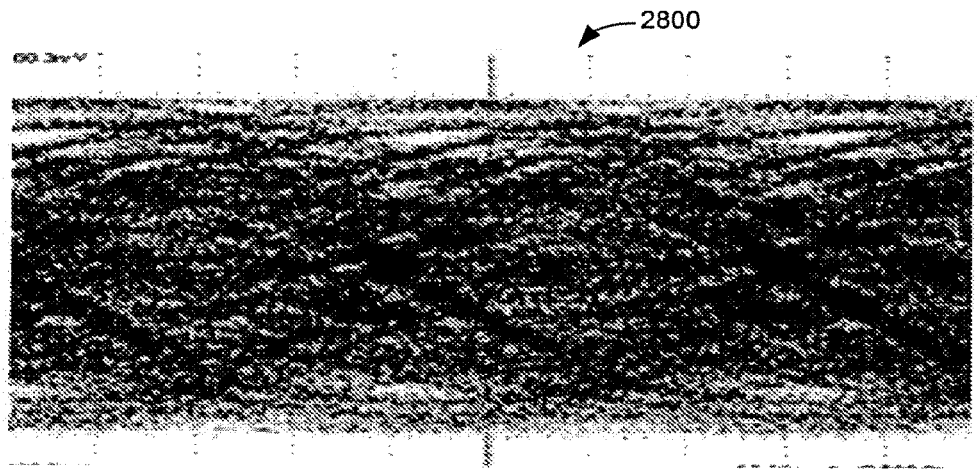
FIG. 28 is a graph that illustrates an unfiltered 10 Gbps (4-level 5 G sym/s) signal after transmission over 150 m of multimode fiber that can be used as input to the present invention.
Figure 29:
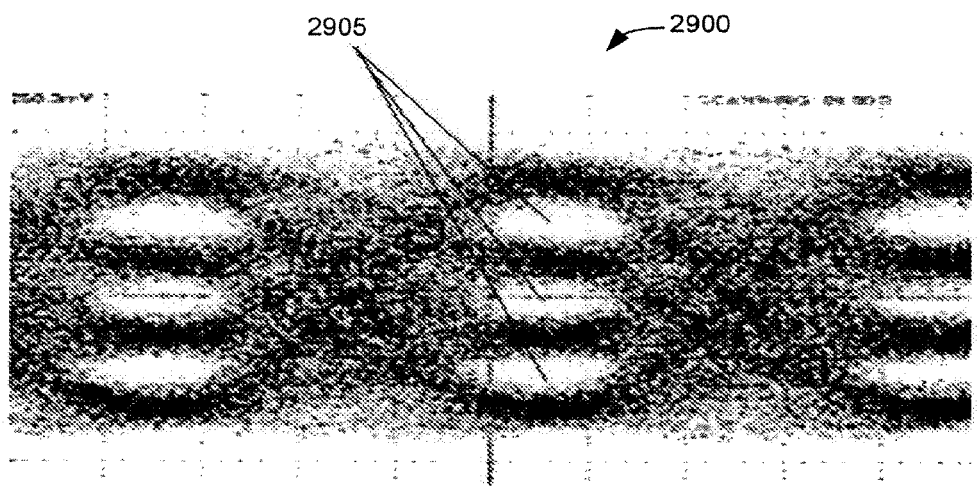
FIG. 29 is a graph that illustrates the multilevel signal of FIG. 28 after equalization with the signal conditioning filter according to one exemplary embodiment of the present invention.

Referring now to FIGS. 28 and 29, these figures demonstrate the improvement provided by the SCF 100 in an optical communications system. The system channel now includes optical components. Specifically, the electrical data signal is converted to an optical signal with a VCSEL (vertical cavity surface emitting laser), transmitted over 150 m of multimode fiber (MMF), and converted back to an electrical signal at the receiver with a photodetector.

FIG. 28 illustrates an eye diagram 2800 where the condition of the received electrical signal when a 4-level 5 Gsym/s (yielding a 10 Gbps data rate) is transmitted. Again, there are no visible eye-openings in the received signal and thus data cannot be reliably recovered.

Meanwhile, in FIG. 29, an eye-diagram 2900 for the same received signal is illustrated but after filtering with the SCF 100 of one exemplary embodiment of the present invention. The four signal levels are now apparent from the eye-openings 2905 which means that data can be recovered from this received and filtered signal.

Therefore, the present invention provides an adaptive filtering approach that combines channel equalization and noise filtering. The method and system of the present invention can easily support high speed digital communications which combines channel equalization and noise filtering in a single framework. The method and system of the present invention can account for the effects that equalization can have on noise filtering, and vice-versa. Furthermore, the method and system are adaptive in nature and have a practical means of implementation for high-speed data communications systems.

It should be understood that the foregoing relates only to illustrate the embodiments of the present invention, and that numerous changes may be made therein without departing from the scope and spirit of the invention as defined by the following claims.

The invention claimed is:

1. A method for processing a series of symbols having a symbol period, comprising:
   mitigating, by a first filter, degradation within respective symbols of the series of symbols, the first filter including a first plurality of delay elements each having a delay less than the symbol period;
   mitigating, by a second filter, inter-symbol interference among the series of symbols, the second filter including a second plurality of delay elements each having a delay substantially equal to the symbol period;
   producing a probability estimate based on an output of at least one of the first and second filters; and
   adjusting a delay of at least one of the delay elements of the first and second plurality of delay elements according to the probability estimate.

2. The method of claim 1, wherein the first filter comprises a first analog filter and the second filter comprises a second analog filter.

3. The method of claim 1, wherein the probability estimate comprises an analog probability estimate.

4. The method of claim 1, wherein the adjusting comprises adjusting, according to the probability estimate, a first time scale of the first filter and a second time scale of the second filter.

5. The method of claim 1, wherein the degradation within respective symbols of the series of symbols comprises ringing.

6. The method of claim 1, wherein the first filter comprises a first linear tapped-delay line filter and the second filter comprises a second a linear tapped-delay line filter.

7. The method of claim 1, wherein the symbol period specifies a time interval spanning between two temporally adjacent symbols in the series of symbols.

8. The method of claim 1, wherein the series of symbols comprises a communication signal.

9. A method for processing a digital signal, comprising:
reducing ringing, jitter, or noise within respective symbols of the digital signal in response to processing the digital signal with a first filter stage including delay elements each having a first time constant less than a symbol period of the digital signal;
reducing interference between symbols of the digital signal in response to processing the digital signal with a second filter stage including delay elements each having a second time constant greater than the symbol period;
generating a probability estimate from an output of the first filter stage or the second filter stage; and
refining at least one of the first time constant and the second time constant based on the probability estimate.

10. The method of claim 9, wherein the first filter stage feeds the second filter stage and the generating comprises generating the probability estimate from an output of the second filter stage.

11. The method of claim 9, wherein the second time constant is greater than the first time constant.

12. The method of claim 9, wherein the symbol period specifies a time interval spanning between two temporally adjacent symbols in a series of symbols of the digital signal.

13. The method of claim 9, wherein at least one of the first and second filters comprises a Gilbert cell coefficient multiplier.

* * * * *